(12) United States Patent
Claseman (10) Patent No.: US 7,554,990 B2
(45) Date of Patent: Jun. 30, 2009

(54) STATIC ADDRESS RESERVATION PROTOCOL IN A DATA NETWORK

(75) Inventor: George R. Claseman, Campbell, CA (US)

(73) Assignee: Micrel, Inc., San Jose, CA (US)

( * ) Notice: Subject to any disclaimer, the term of this patent is extended or adjusted under 35 U.S.C. 154(b) by 976 days.

(21) Appl. No.: 10/846,182

(22) Filed: May 13, 2004

(65) Prior Publication Data

US 2005/0254503 A1      Nov. 17, 2005

(51) Int. Cl.
H04L 12/28      (2006.01)
(52) U.S. Cl. .................................. 370/395.41
(58) Field of Classification Search ........................ None
See application file for complete search history.

(56) References Cited

U.S. PATENT DOCUMENTS

| | | | | |
|---|---|---|---|---|
| 5,515,376 A * | 5/1996 | Murthy et al. | ............... | 370/402 |
| 5,649,109 A | 7/1997 | Griesmer et al. | | |
| 5,835,723 A | 11/1998 | Andrews et al. | | |
| 6,085,101 A * | 7/2000 | Jain et al. | ................... | 455/500 |
| 6,308,218 B1 | 10/2001 | Vasa | | |
| 6,446,131 B1 | 9/2002 | Khansari et al. | | |
| 6,556,575 B1 * | 4/2003 | Denio et al. | ................. | 370/401 |
| 6,615,336 B1 | 9/2003 | Chen et al. | | |
| 6,625,645 B1 | 9/2003 | Van Horne et al. | | |
| 6,633,567 B1 * | 10/2003 | Brown | ...................... | 370/395.3 |
| 7,068,655 B2 * | 6/2006 | March et al. | ................ | 370/392 |
| 7,126,939 B2 * | 10/2006 | Barany et al. | ............... | 370/352 |
| 2002/0051459 A1 * | 5/2002 | Denecheau et al. | ......... | 370/409 |
| 2005/0094568 A1 * | 5/2005 | Judd | .......................... | 370/242 |

* cited by examiner

Primary Examiner—Edan Orgad
Assistant Examiner—Blanche Wong
(74) Attorney, Agent, or Firm—Patent Law Group LLP; Carmen C. Cook (57) ABSTRACT

A method in a data network where the data network includes multiple terminal points interconnected by one or more network intermediate devices includes transmitting an invitation message from a first terminal point where the invitation message is broadcast through the data network to the multiple terminal points; in response to the invitation message, sending a reservation response message from a second terminal point where the reservation response message is broadcast through the data network to the multiple terminal points; and receiving the reservation response message at a first network intermediate device. The method further includes in response to the reservation response message, storing in the first network intermediate device for one reservation cycle a static forwarding address entry including the source address of the reservation response message and an identification of the port of the first network intermediate device on which the reservation response message is received.

46 Claims, 4 Drawing Sheets

STATIC ADDRESS RESERVATION PROTOCOL IN A DATA NETWORK

FIELD OF THE INVENTION

The invention relates to data networks and, in particular, to a protocol and a method for static address reservation in a data network.

DESCRIPTION OF THE RELATED ART

The present invention concerns data communication networks, such as local area networks (LAN), wide area networks (WAN) or wireless communication systems. A data communication network, hereinafter "a data network," includes hardware network elements connected thereto for transmitting and relaying messages to nodes coupled to the network in accordance with a predefined network protocol. Hardware network elements include communication infrastructure devices, such as hubs, gateways, switches, bridges or routers, that have multiple ports for interconnecting multiple media links in the data network. Hardware network elements are used to interconnect multiple networks or multiple segments of a single data network.

For instance, different IEEE 802 LANs (e.g., wireless LANs, Ethernet LANs) are often interconnected using layer two devices such as bridges and switches. Bridges and switches have multiple ports for interconnecting multiple segments of a network or multiple networks. Bridges and switches operate as transparent devices to accept every frame transmitted on all the networks to which it is attached. In some cases, there may be a filtering mechanism that is setup by the management node to prevent certain traffic from going through the bridge. A frame received from a network destined for the same network is discarded by the bridge or switch. A frame received from a network destined for another network is forwarded through an appropriate outgoing port of the bridge or switch to the destination network.

To forward a data frame received on an incoming port, a bridge needs to know which outgoing port is associated with the destination address of the incoming data frame. Bridges and other layer-two devices typically include an address hash table for storing destination addresses and an identification of the port associated with each destination address. The address hash table is sometimes referred to as a forwarding address table. For example, a look-up table can be used to store each known destination address and the associated outgoing port of the layer-two device to which the address belongs. If a frame arrives with an unknown destination address, the incoming frame is output on all active ports of the layer-two device except the one the frame arrived on. This is referred to as a "flooding algorithm." If a frame arrives with a known destination address in the forwarding address table, the incoming frame is put on the proper port to be forwarded to the destination network and the incoming frame is not flooded.

Under the IEEE 802.1 bridge protocol, a backward learning algorithm is used by the layer-two device to learn the destination addresses. Specifically, a layer-two device, such as a bridge, looks at the source addresses of all frames being received on every port of the device. By looking at the source address of each frame, the bridge can associate each network address with a respective port from which the frame is received. An entry in the forwarding address table is made noting that frames with a given destination address should go to a given port. Over time, the bridge learns where the destination addresses are and which destination address can be reachable through which of its ports. In this manner, flooding of incoming frames is lessened and unnecessary network traffic is reduced.

In a conventional layer-two device, the forwarding address table is a dynamic look-up table where the entries in the table are subject to an aging process. That is, periodically, a process in the bridge scans the forwarding address table and purges all entries that are considered "old" in order to make room for new entries. Typically, entries more than a few minutes old are purged. If a terminal point in the data network is quiet for a time period exceeding the purge time of the forwarding address table, the address entry associated with that node is removed and any traffic destined for the node has to be flooded until the node sends a frame itself so that its network address can be learned.

In a more complex network system including multiple bridges connecting multiple data networks, a spanning tree, determined by a spanning tree algorithm, is often used to determine network connectivity and to ensure that, at any moment, only one active physical path is used between each pair of source and destination nodes of the network.

The nature of the forwarding address table in a bridge or other layer-two devices is that addresses are learned but do not remain permanent and can be forgotten over time. In some applications, it is desirable that certain destination addresses be stored permanently in the address hash table. Means to store permanent destination addresses in a forwarding address table in a bridge device are known and are usually done through complex network management functions. For example, a permanent look-up table can be used where the table is initialized by an external processor. Entries of the desired permanent addresses and identifications of the associated port are programmed into the look-up table by the external processor. However, these conventional schemes to store permanent address entries often require a separate management scheme which increases the complexity of the network hardware. Furthermore, when a large amount of addresses need to be setup in a large number of network intermediate devices, the programming of the permanent look-up table can become burdensome. In particular, the major burden occurs when there is a topology change or when there is an active link failure. If the failed link is near the core of the layer 2 network, this could cause significant changes to permanent forwarding information in the bridges. Some bridge hardware is equipped to execute fast address flushing of static entries while others are not.

Therefore, it is desirable to provide a means for storing permanent network addresses in hardware network devices without requiring complex management functions or hardware.

SUMMARY OF THE INVENTION

According to one embodiment of the present invention, a method in a data network where the data network includes multiple terminal points interconnected by one or more network intermediate devices includes transmitting an invitation message from a first terminal point where the invitation message is broadcast through the data network to the multiple terminal points; in response to the invitation message, sending a reservation response message from a second terminal point where the reservation response message is broadcast through the data network to the multiple terminal points; and receiving the reservation response message at a first network intermediate device. The method further includes in response to the reservation response message, storing in the first network intermediate device for one reservation cycle a static forwarding address entry including the source address of the reservation response message and an identification of the port of the first network intermediate device on which the reservation response message is received.

In one embodiment, the method further includes at the expiration of each reservation cycle, repeating the transmission of the invitation message, repeating the transmission of the reservation response message and repeating the storage of the static address entry. Furthermore, the method includes in response to receiving the periodic invitation messages, aging the static forwarding address entries stored in the one or more network intermediate devices; upon receipt of a reservation response message from a responding terminal point, determining at the first network intermediate device whether a static address entry has been stored for that responding terminal point. If a static address entry has been stored for that responding terminal point, the method proceeds to update the static address entry associated with the responding terminal point. Finally, the method includes removing static forwarding address entries in the one or more network intermediate devices that have been aged.

The present invention is better understood upon consideration of the detailed description below and the accompanying drawings.

DETAILED DESCRIPTION OF THE PREFERRED EMBODIMENTS

In accordance with the principles of the present invention, a static address reservation protocol is implemented in a data network for locking network addresses in a network intermediate device as static addresses. In one embodiment, a designated terminal point on a data network transmits a broadcast message inviting other terminal points on the network to become static addresses in the network intermediate devices. Terminal points, wishing to become static address entries, respond with broadcast response messages. Network intermediate devices that understand the protocol of the present invention will learn the network addresses of the responding terminal points and make entries in a static forwarding address table associating the network addresses with the corresponding ports. In this manner, the network intermediate devices store static address entries which are entries that are not subject to the conventional aging process. Using static address entries can reduce the need for flooding of data frames and thus reduce unnecessary broadcast traffic in the data network.

A key benefit of the static address reservation protocol of the present invention is that the protocol provides a means for hardware network elements within a network to coordinate static address reservation without the need for an elaborate management scheme. The protocol also provides a means for fast static address configuration and to bind the static address life for a desired amount of time. The static address reservation protocol of the present invention is operated between terminal points of the data network and does not require each intermediate device to support a dedicated management protocol with a remote network manager for facilitating permanent network address storage. The protocol also operates as a distributed system in that terminal points respond if they wish to become or remain static address entries in the forwarding address tables of the network intermediate devices. Network intermediate devices that do not understand the static address reservation protocol of the present invention will simply forward the invitation or response messages onto other network intermediate devices that do. Thus, implementation of the static address reservation protocol of the present invention is simplified. The static address reservation protocol of the present invention provides a simple approach and a cost-effective solution to permanent address reservation in a data network.

In the present description, a "dynamic" address entry refers to an address entry in a forwarding address table of a network intermediate device that is subject to the conventional aging process as described by the conventional communication protocol, such as the IEEE 802.1 protocol. That is, a network address is learned and is stored in the device for a limited amount of time, e.g. a few minutes, and is purged if the time-base associated with the learned address has not been updated by the receipt of a data frame at the device. On the other hand, a "static" address entry will be used in the present description to describe a network address entry being stored in a forwarding address table of a network intermediate device that is not subject to the conventional aging process. The static address entry may be subject to an alternate aging process determined by a reservation cycle or other static reservation cycle time period which is typically much longer than the conventional address aging time. An address entry in a forwarding address table may also be a "permanent" address entry which refers to an address entry that has been set up by an external management process to be stored in the forwarding address table and not to be removed unless instructed by the external management process.

The static address reservation protocol of the present invention is implemented in terminal points and in network intermediate devices of a data network. In the present description, the terminal points of a data network refer to any hardware network elements that are capable of transmitting or receiving messages. A terminal point can be a computer, a server, a router, a gateway, or other layer two devices. Furthermore, in the present description, "network intermediate devices" of a data network refer to network infrastructure elements that are used to interconnect data networks or segments of a data network for relaying messages between terminal points of the data network(s). For instance, in an IEEE 802 LAN, network intermediate devices can include layer two devices such as transparent multi-port bridges and layer 2 switches. Bridges are multi-port devices that allow simultaneous communication between nodes coupled to the ports of the bridge. A switch has multiple paths between each input-output port pair. A LAN switch can forward multiple frames simultaneously. In general, a network intermediate device includes multiple communication ports, a controller and a memory unit.

Furthermore, for the sake of simplicity, the term "a data network" will be used in the present description to refer to a data network including multiple network segments interconnected by network intermediate devices or multiple networks interconnected by network intermediate devices. The use of the term "a data network" is not intended to limit the application of the present invention to a single data network such as a single LAN.

Figure 1:
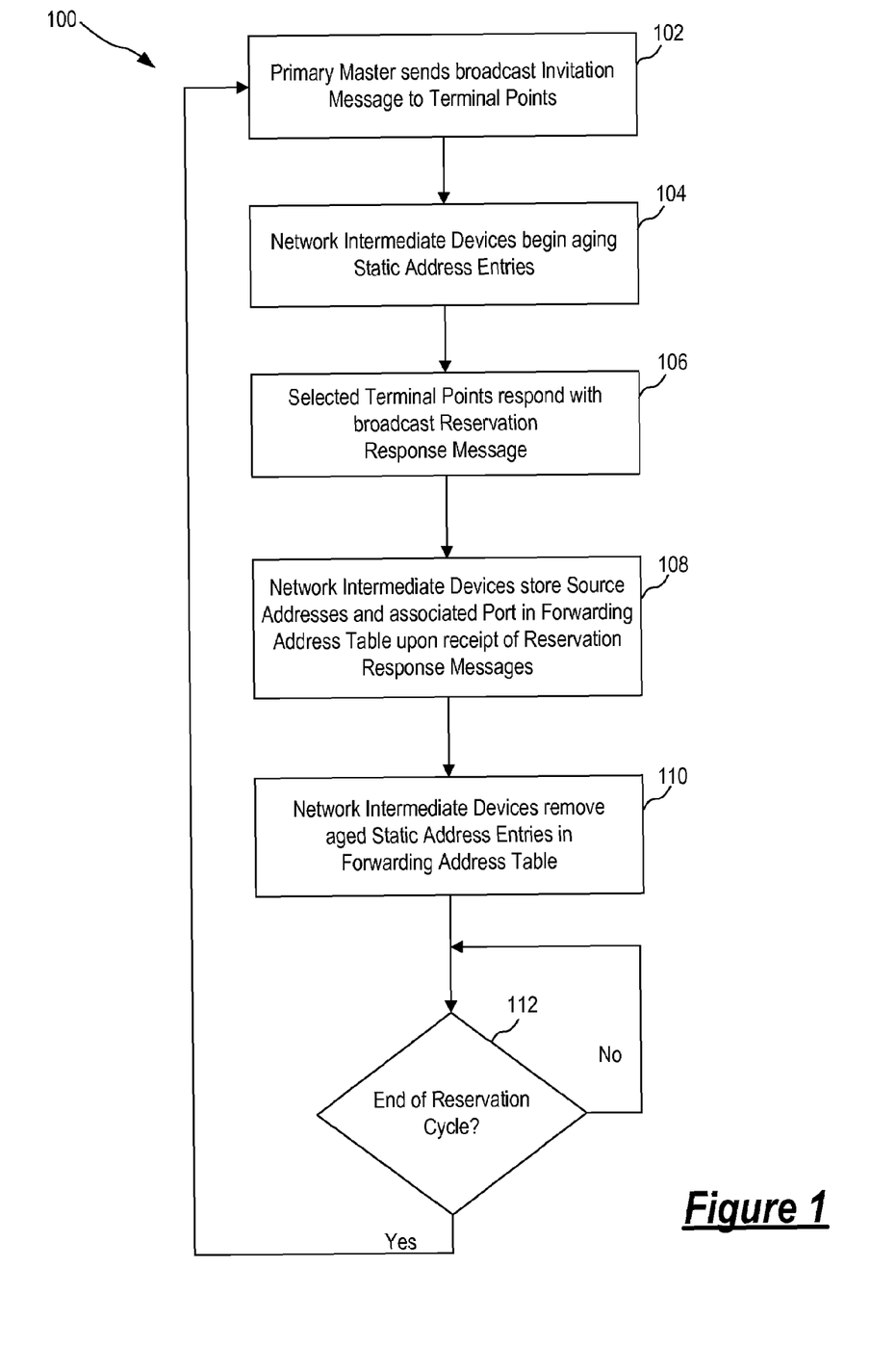
FIG. 1 is a flowchart illustrating the static address reservation protocol according to one embodiment of the present invention.
Figure 2:
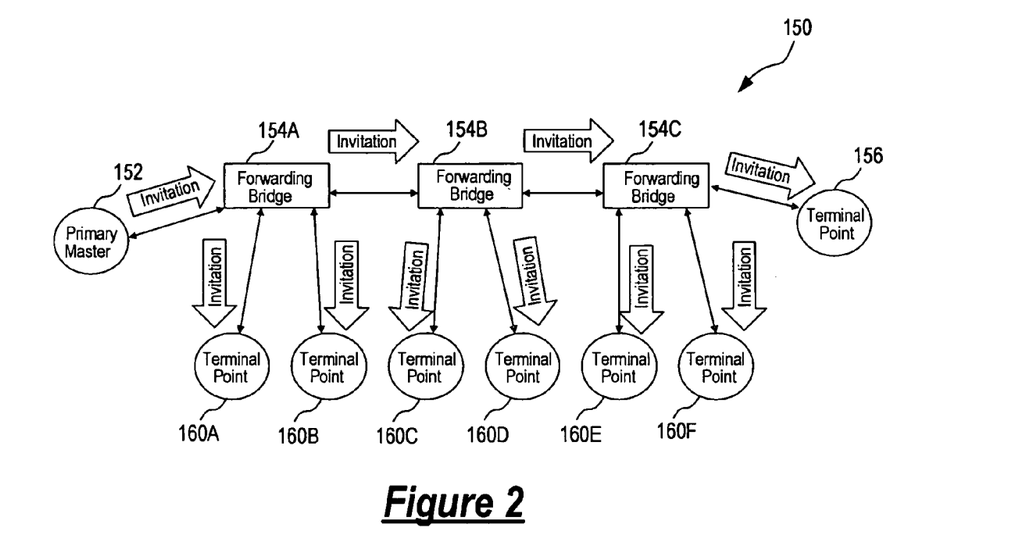
FIG. 2 is schematic diagram of a data network illustrating the operation of the invitation scheme of the static address reservation protocol of FIG. 1.
Figure 3:
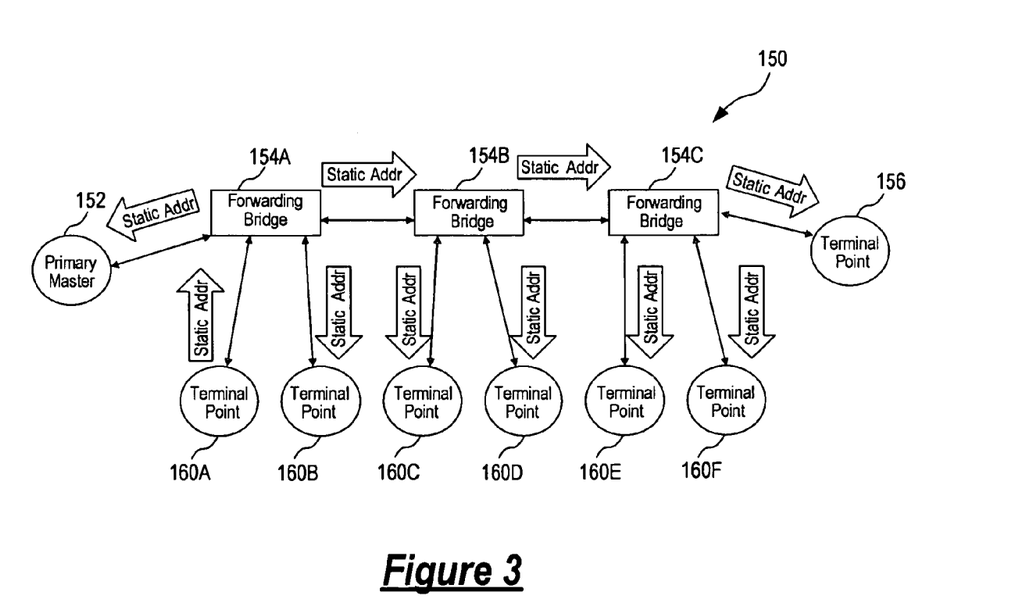
FIG. 3 is schematic diagram of a data network illustrating the operation of the response and reservation scheme of the static address reservation protocol of FIG. 1.

FIG. 1 is a flowchart illustrating the static address reservation protocol according to one embodiment of the present invention. The operation of the static address reservation protocol of the present invention will be described with reference to FIGS. 2 and 3. FIG. 2 is schematic diagram of a data network illustrating the operation of the invitation scheme of the static address reservation protocol of FIG. 1. FIG. 3 is schematic diagram of a data network illustrating the operation of the response and reservation scheme of the static address reservation protocol of FIG. 1.

Referring to FIG. 1, method 100 illustrates the basic components of the static address reservation protocol of present invention which include an invitation scheme, a response and reservation scheme and a reservation update scheme. FIG. 2 illustrates a representative data network in which method 100 may be implemented. In FIG. 2, a data network 150 includes terminal points 152, 156 and 160A through 160F. Terminal point 152 has been designated as a primary master device. The primary master device in the static address reservation protocol of the present invention operates to initiate the address reservation routine. However, the static address reservation protocol operates in a distributed manner and thus no additional processing power is required of the terminal point which is functioning as the primary master device.

Data network 150 also includes network intermediate devices, in the form of bridges 154A through 154C, for interconnecting the terminal points of the data network. For the purpose of the present illustration, bridge 154A and bridge 154C are assumed to have been configured to support the static address reservation protocol of the present invention while bridge 154B is assumed to not support the static address reservation protocol of the present invention. Bridges 154A to 154C are multi-port bridge devices including memory units configured as forwarding address tables for storing learned source addresses. The forwarding address tables are typically configured as look-up tables associating each address entry with an identification of the corresponding port of the bridge device.

In method 100, at the start of a reservation cycle, primary master 152 sends an invitation message that is broadcast to all of the terminal points in data network 150 (step 102). The invitation message invites the terminal points to become static address entries in the network intermediate devices of data network 150. FIG. 2 illustrates the transmission of the broadcast invitation message from primary master 152 through bridges 154A to 154C to terminal points 156 and 160A to 160F.

In the present embodiment, method 100 implements a reservation update scheme for updating the static address stored in the network intermediate devices. During the first reservation cycle of method 100, it is assumed that no static address entries have been stored and thus step 104 is skipped. The operation of the reservation update scheme in aging static address entries will be explained in more detail below.

Terminal points in data network 150, upon receipt of the invitation message from primary master 152, decide if they want their network addresses to become static address entries in the network intermediate devices. If a terminal point decides to have its network address becomes a static address entry, the terminal point will send a reservation response message that is broadcast to all the terminal points in data network 150 (step 106). FIG. 3 illustrates the sending of a reservation response message from terminal point 160A which reservation response message is broadcast through network 150 through all network intermediate devices (bridges 154A to 154C) to terminal points 152, 156 and 160B to 160F. The reservation response message includes the source address of the responding terminal point and an indication that the source address should become a static address entry. Terminal points not wishing to have their network addresses become static or terminal points not configured to understand the static address reservation protocol of the present invention will simply ignore the invitation message.

In some applications, the primary master may itself wish to have its own network address become a static address entry in the network intermediate devices. The primary master can participate in the static address reservation cycle by sending a broadcast reservation response message in response to its own invitation message.

As the broadcast reservation response messages from the responding terminal points are sent through data network 150, network intermediate devices that are configured to support the static address reservation protocol of the present invention, such as bridges 154A and 154C, will recognize the reservation response messages received on their ports. Those network intermediate devices will proceed to store the source address associated with each reservation response message and an identification of the incoming port of the message as static address entry in the forwarding address tables of the network intermediate devices (step 108).

Specifically, the network intermediate device usually includes a memory unit configured as a look-up table functioning as the forwarding address table. The forwarding address table is typically dynamic in the sense that the entries of the address table are subject to the conventional aging process. Such a forwarding address table will be referred to in the present description as a "dynamic forwarding address table." In one embodiment, a network intermediate device stores a static address in the dynamic forwarding address table and makes an address entry in the dynamic forwarding address table "static" by locking the address entry in a manner so as to prevent the static address entry from being removed during the conventional aging process.

In an alternate embodiment, the network intermediate device may include a memory unit configured to support a dynamic forwarding address table operating in a conventional manner and a static forwarding address table operating in accordance with the static address reservation protocol of the present invention for storing static address entries. A network intermediate device, upon receiving a reservation response message on one of its ports, will make an entry in the static forwarding address table including the source address of the reservation response message and an identification of the port on which the message is received. Of course, the network intermediate device can also include a lookup table for storing permanent forwarding address entries that are programmed by a network manager.

The methods described above for storing static address entries are exemplary methods only and are not intended to limit the implementation of the static address reservation protocol of the present invention to using the above-described methods only. One of ordinary skill in the art would appreciate that other methods for storing the forwarding addresses as static address entries may be used without departing from the scope of the present invention. For example, a memory unit in a network intermediate device may be configured as one look-up table where a first section of entries in the look-up table is used for the dynamic forwarding addresses, a second section of the entries in the look-up table is used for the static forwarding addresses, and a third section of the entries is used for permanent forwarding addresses programmed by the network manager. In the following description, the term "a static address entry in a forwarding address table" will be used generally to refer to an address entry in a dynamic forwarding address table which has been made static or an address entry in a static forwarding address table.

In data network 150, network intermediate devices, such as bridge 154B, that do not support the static address reservation protocol of the present invention will not act on the reservation response message when one is received but will simply forward the broadcast reservation response message onto other intermediate devices or other terminal points of the data network. The implementation of the static address reservation protocol of the present invention provides flexibility as the protocol does not require every node in a data network to support the protocol.

Through the use of the invitation message and the reservation response message, network intermediate devices that support the static address reservation protocol of the present invention will store thereon static address entries for terminal points who responded with an indication to become static address entries. The static address entries can be then used to transmit messages to the identified terminal points, thereby reducing the use of flooding and unnecessary network broadcast traffic.

In the present embodiment, the static address reservation protocol of the present invention includes a reservation update scheme. The reservation update scheme provides a means to refresh or update the static address entries in the forwarding address table. In this manner, static address entries for terminal points which may have been removed from the data network or which are not operational can be removed from the forwarding address table. The reservation update scheme is an optional feature of the protocol of the present invention and may be omitted in other embodiments of the static address reservation protocol of the present invention. In some applications, the data network may include terminal points whose connection to the network is predominantly stable over time and therefore once the static address entries have been made, update of the static address entries is not necessary.

In accordance with the present embodiment, the static address entries in the forwarding address table are subject to an aging process governed by a reservation cycle. The static address entry aging process is independent of and separate from the conventional aging process of the dynamic address entries. The reservation cycle typically has a duration much longer than the duration of the conventional dynamic address entry aging process.

The reservation update scheme in method 100 operates as follows. Method 100 repeats its operation based on a reservation cycle. When the end of a reservation cycle is reached (step 112), method 100 returns to step 102 when a broadcast invitation message is again sent out by the primary master. In this manner, method 100 operates in a continuous loop process whereby a periodic invitation message is sent out by the primary master to allow terminal points to remain static in the forwarding address table. The transmission of a broadcast invitation message signifies the start of each reservation cycle.

When a network intermediate device supporting the static address reservation protocol of the present invention receives the periodic invitation message, the network intermediate device understands that the current reservation cycle has expired and will subject the static address entries in the forwarding address table to an aging processing (step 104). In one embodiment, in the forwarding address table, each forwarding address entry is given a time stamp to indicate the current time or the time of the creation of the entry. Terminal points wishing to remain as static address entries will respond to the periodic invitation messages by sending a broadcast reservation response message (step 106). The static address entries associated with the responding terminal points will be updated in the forwarding address table (step 108). For instance, the time stamp for the static address entries associated with the responding terminal points can be reset. When a static address entry has not been updated for a given period of time, the static address entry is deemed aged and will be removed from the forwarding address table to make room for more entries (step 110). In this manner, the static address reservation protocol of the present invention operates continuously to store active static address entries or new static address entries for data network 150.

In one embodiment, instead of using a time stamp, a one-bit data value can be used to facilitate the aging process. Specifically, the reservation cycles are designated as even and odd cycles by the use of the one-bit data value. A static address entry made during an even reservation cycle will remain valid through the even reservation cycle and vice versa. Each network intermediate device includes a global indicator designating the current reservation cycle as even or odd. The network intermediate device subjects the static address entries to an aging process (step 104) by aging entries made during an even cycle when the current cycle is an odd cycle and vice versa. The aging can be performed by converting the static address entries to dynamic address entries. In this manner, only one bit is required to indicate the status of each static address entry.

In yet another alternate embodiment, the network intermediate device subjects the static address entries to an aging process (step 104) by converting the static address entries to dynamic address entries where the dynamic address entries will age out under the normal aging parameter for the network intermediate device. For example, under IEEE 802.1D, the aging parameter for a bridge device is about 5 minutes. Thus, at step 110, static address entries that have been converted to dynamic address entries and have aged under the normal aging parameter will be removed.

Furthermore, in another embodiment, the reservation update scheme operate by including a static reservation cycle time in the periodic invitation message. The network intermediate devices will convert static address entries into dynamic address entries if another invitation message has not been received at the expiration of the static reservation cycle time. The static reservation cycle time associated with the invitation message thus bounds the static period and allows resources in the forwarding address tables be freed up if a reservation cycle ended without a renewal invitation message to start a new reservation cycle. A time value in the invitation message representing an indefinite time can be used to indicate that the static address entries should remain static until another reservation cycle was started by the sending and receipt of an invitation message. In this implementation, the static address entries do not need a timestamp associated with each entry as the reservation time is associated with the invitation message from the primary master device. Furthermore, the static reservation cycle time value can be used by a standby master in a backup protection scheme to determine if the primary master is operative, as will be described in more detail below.

According to another embodiment of the present invention, the invitation message includes grouping information that would invite specific terminal points to join the static address entries. The grouping can be setup as a priority system or by certain classification of the terminal points or some other arbitrary means. For example, the invitation messages could be setup to invite only router terminal points in one instance and printer devices in another instance. The grouping can be carried out in a graduated scheme or as a field of master bits specifying each group of terminal points in particular. Furthermore, the invitation message for each group of terminal points can include a different static reservation cycle time so that one class of terminal points can become static entries for a longer period of time than another class of terminal points. For instance, router devices can be given a longer static reservation cycle time than printer devices.

In the embodiment described above, the reservation update scheme operates based on a reservation cycle. In other embodiments, the reservation update scheme can operate based on other timing and aging criteria. In one embodiment, address entries are stored as static address entries for only specific times of the day or specific days of the week. A cyclic reservation update method is then used to initiate the next reservation cycle. That is, each reservation cycle is initiated at the prescribed time period (certain time of the day or certain day of the week) and new static address entries are added or removed at the start of each of the reservation cycle. In some cases, provisions can be provided to allow new static address entries to be added during the reservation cycle.

In the cyclic reservation update method, a flushing mechanism can be provided to remove static address entries associated with inactive terminal points. Thus, a terminal point to be inactivated and wishing to make a graceful exit can issue a leave static group message. Network intermediate devices that comply with the static address reservation protocol of the present invention will receive the leave static group message and will flush the associated address entry accordingly. When a terminal point is not configured to issue the leave static group message, the terminal point can exit the data network and the cyclic reservation update method will clean up the address entry during the next reservation update cycle.

Alternately, the reservation cycle can also be triggered by a topology change recognized by the network intermediate devices. Thus, a network intermediate device can send a topology change notification message to the primary master to cause the primary master to start or restart the reservation cycle by sending the broadcast invitation message. The topology change notification message can be transmitted by broadcast or multicast. The network intermediate device will remove static address entries where a reservation response message for that address has not been received.

Figure 4:
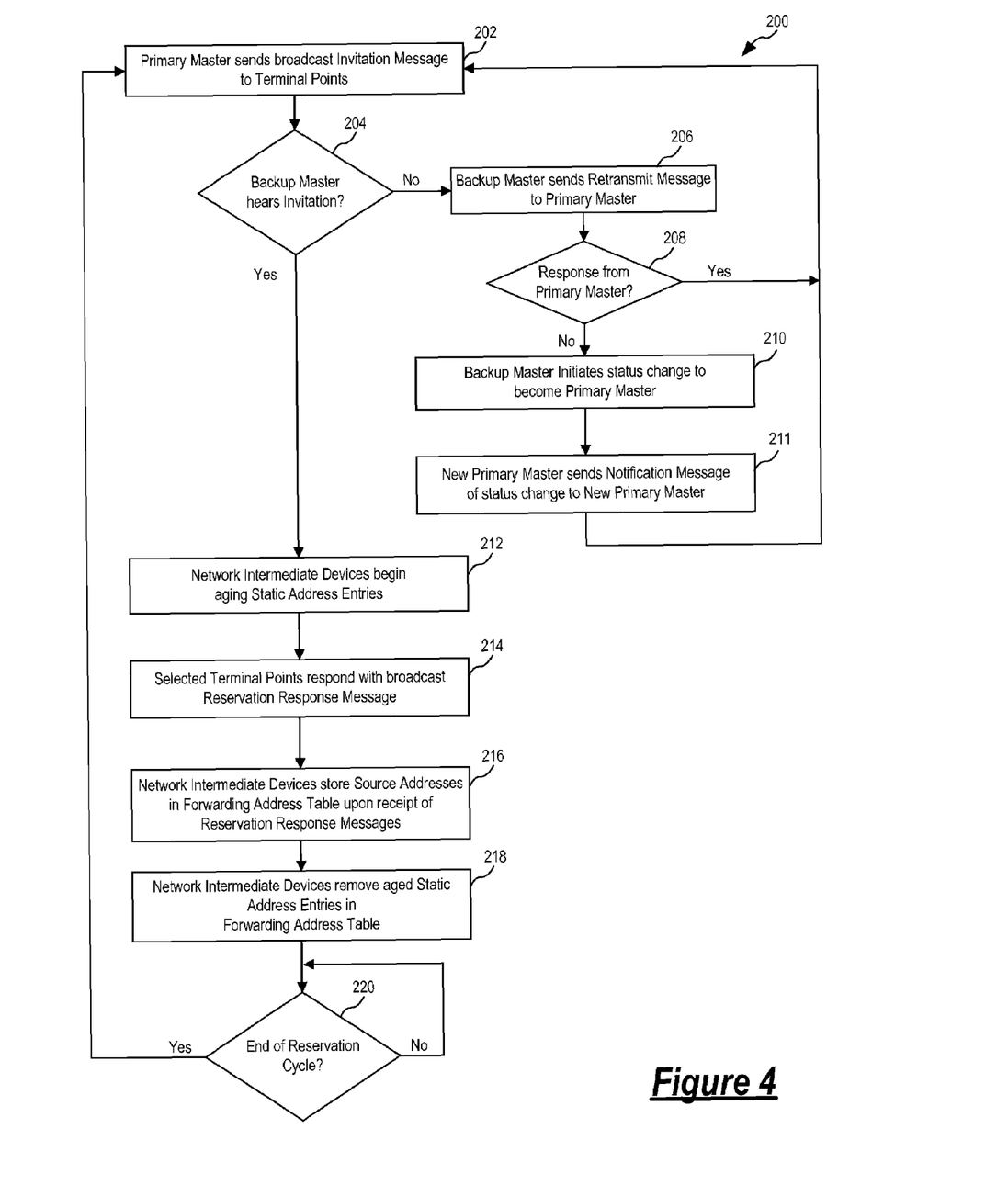
FIG. 4 is a flowchart illustrating the static address reservation protocol according to an alternate embodiment of the present invention.
Figure 5:
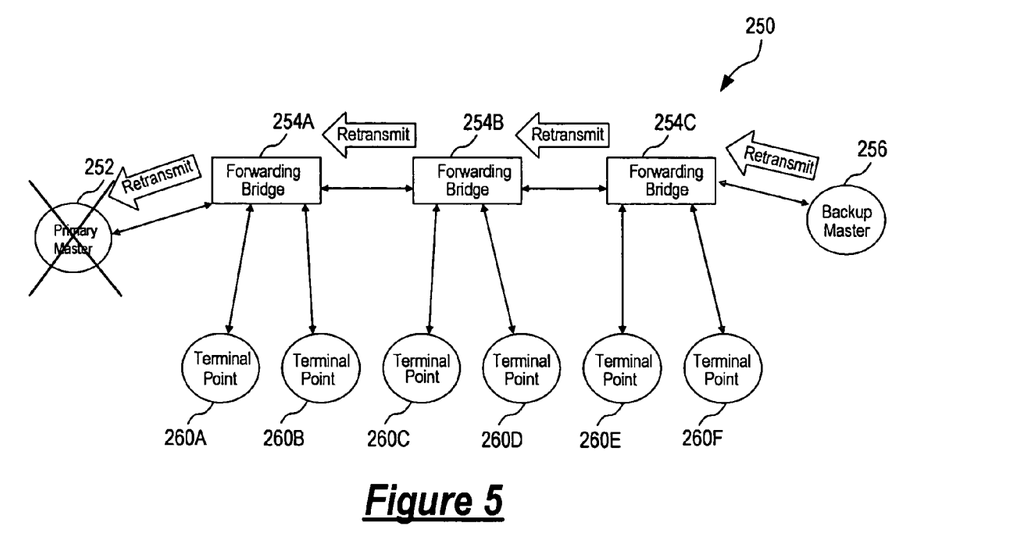
FIG. 5 is a schematic diagram of a data network illustrating the operation of the retransmit request scheme of the static address reservation protocol of FIG. 4.
Figure 6:
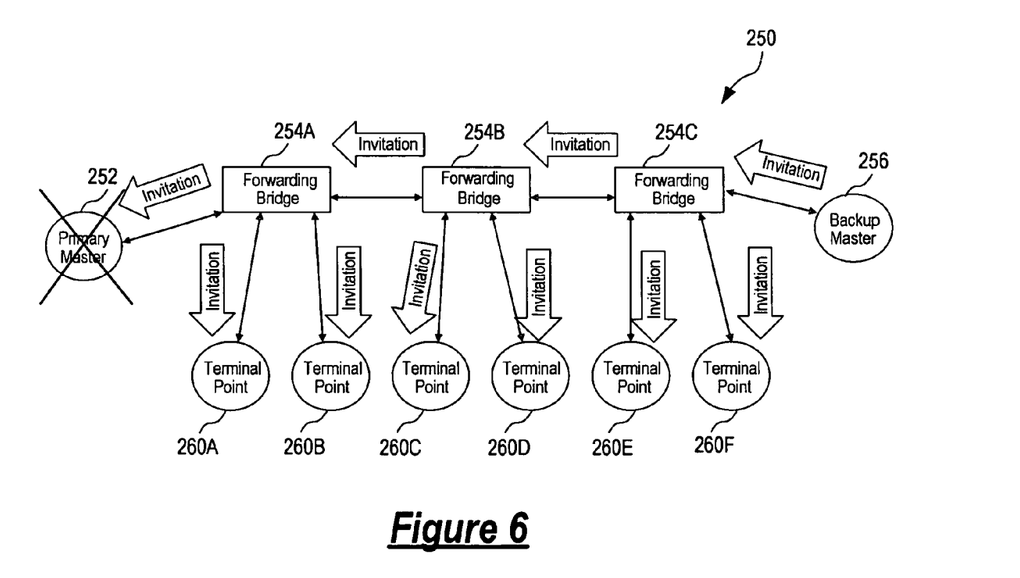
FIG. 6 is schematic diagram of a data network illustrating the operation of the backup master invitation scheme of the static address reservation protocol of FIG. 4.

In method 100 of FIG. 1, primary master 152 functions to initiate and maintain the static address reservation process by sending a periodic invitation message. However, the static address reservation process may be stalled if the primary master becomes inoperative. According to an alternate embodiment of the present invention, backup protection for the primary master is provided in the static address reservation protocol of the present invention. FIG. 4 is a flowchart illustrating the static address reservation protocol according to an alternate embodiment of the present invention. The operation of the static address reservation protocol according to the alternate embodiment of the present invention will be described with reference to FIGS. 5 and 6. FIGS. 5 and 6 are schematic diagrams of a data network illustrating the operation of the retransmit request scheme and backup invitation scheme of the static address reservation protocol of FIG. 4.

Referring to FIG. 4, method 200 illustrates the basic components of the static address reservation protocol in the alternate embodiment of the present invention which include an invitation scheme, a response and reservation scheme, a reservation update scheme and a backup protection scheme. FIG. 5 illustrates a representative data network 250 in which method 200 is implemented. In FIG. 5, data network 250 includes terminal points 252, 256 and 260A to 260F. Terminal point 252 has been designated as a primary master device while terminal point 256 has been designated as a backup master device. Data network 250 also includes network intermediate devices, in the form of bridges 254A to 254C, for interconnecting the terminal points of the data network. For the purpose of the present illustration, bridge 254A and bridge 254C are assumed to have been configured to understand the static address reservation protocol of the present invention while bridge 254B is assumed to not support the static address reservation protocol of the present invention. In the present illustration, data network 250 includes a single backup master 256. In other embodiments, the data network may include multiple backup masters to further enhance the robustness of the protocol.

In method 200 of FIG. 4, backup protection for the primary master is provided by using backup master 256 to monitor the periodic invitation message sent by primary master 252. If the backup master fails to hear the periodic invitation message after a predetermined time, the backup master can assume that the primary master has failed and take corrective action to maintain the operation of the static address reservation process.

Referring to FIG. 4, primary master 252 sends a periodic broadcast invitation message to the terminal points of data network 250 (step 202). In the present embodiment, the invitation message includes a static reservation cycle time which indicates to the terminal points the duration of each static address reservation in the network intermediate devices. The static reservation cycle time included in the invitation message can be used by backup master 256 to determine the expiration of each reservation cycle and thereby monitor the operational status of primary master 252. In the case where the static reservation cycle time has been set to an indefinite period, the backup master can be configured to communicate with the primary master periodically for a health check. The backup master can thus determine whether or not the primary master is operational.

During the first reservation cycle of method 200, the static address reservation protocol of the present invention operates in the same manner as method 100 of FIG. 1 in that terminal points wishing to become "static" will send reservation response messages (step 214) and network intermediate devices supporting the static address reservation protocol will store the network addresses and the port identification of the responding terminal points as static address entries in the forwarding address tables (step 216). During subsequent reservation cycles, the network intermediate devices will subject the static address entries to an aging process (step 212) and aged static address entries may be removed from the forwarding address table when the terminal points associated with the aged entries fail to transmit a reservation response message to update the static address entries (step 218).

At the expiration of the each reservation cycle (step 220), method 200 returns to step 202 and the process repeats where the primary master sends a periodic invitation message inviting the terminal points of data network 250 to become static entries or to remain as static entries in the network intermediate devices. The backup protection scheme of the static address reservation protocol in the present embodiment operates by having the backup master listening to the presence of the periodic invitation messages. When a data network includes multiple backup masters, all of the backup masters will listen to the periodic invitation message and each backup master will act based upon its position in the queue of backup masters. In the present illustration, it is assumed that backup master 256 is either a single backup master in the data network or one of multiple backup masters where backup master 256 is the next in queue to substitute for the primary master.

Based on the static reservation cycle time included in each invitation message, backup master 256 or all of the backup masters can determine when each reservation cycle ends and when to expect the next periodic invitation message from primary master 252. When backup master 256 receives the invitation message (step 204), method 200 will proceed as normal to steps 212-220.

However, when backup master 256 fails to receive the invitation message at the appointed time (step 204), backup master 256 will send a retransmit request message directed to primary master 252 (step 206). As illustrated in FIG. 5, the retransmit request message sent by backup master 256 is transmitted through bridges 254A to 254C to primary master 252. If primary master 252 is operational, the primary master will send a response to backup master 256. When a response from the primary master is received (step 208), the backup master resumes listening to the invitation messages. Method 200 returns to step 202 where the primary master should retransmit the broadcast invitation message in accordance with the retransmit request from the backup master.

However, when backup master 256 fails to receive a response from primary master 252 (step 208), backup master 256 will assume that the primary master is inoperative and will resume control of the static address reservation process. Thus, at step 210, backup master 256 initiates a status change to become the primary master (the new primary master). The new primary master then sends a notification message indicating the status change (step 211). The notification message can be a broadcast message sent to all terminal points, including the original primary master and all other backup masters, in the data network to make the change to a new primary master globally known. Alternately, the notification message can be a multicast message sent to all other backup masters and to the original primary master only. In this manner, when the data network includes multiple backup masters, the backup masters will be notified of the change to the new primary master so that the backup masters can now operate to provide backup protection for the new primary master. The backup masters can also determine which backup master is now next in queue to substitute for the primary master.

After the status change from backup master 256 to new primary master 256, method 200 returns to step 202 where the new primary master will send the broadcast invitation message to all the terminal points. As shown in FIG. 6, primary master 252 is assumed to be inoperative, and backup master 256 has assumed control of the static address reservation process by sending the invitation message which is broadcast to all terminal points. Method 200 then proceeds as normal to steps 212-220 where aged static address entries are removed and reservation response messages are received to create new static address entries or maintain old static address entries in the forwarding address tables of the network intermediate devices.

As described above, data network 250 includes a single backup master. However, in other embodiments, the data network implementing the static address reservation protocol of the present invention can include multiple backup masters to provide redundancy. Various mechanisms can be used to determine a queue for the multiple backup masters to assuming the role of the primary master in the event that the primary master fails. By using one or more backup masters to provide backup protection, the operation of the static address reservation protocol of the present invention can be made more robust and fail-proof.

The static address reservation protocol of the present invention provides many advantages. First, the static address reservation protocol can be used to give unmanaged network intermediate devices a simple way to make forwarding addresses static in the forwarding address table. In this manner, excess network traffic can be pared down.

Second, the static address reservation protocol uses a single managing device, the primary master, to start the static address reservation process and to periodically renew the static address entries. No elaborate management scheme or network manager is required.

Although static address reservation can be carried out using SNMP (Simple Network Management Protocol), such a process is cumbersome as each network intermediate device needs to be programmed to include each desired static address entry. When a large amount of addresses is to be programmed in a large amount of intermediate devices, programming using SNMP becomes impractical.

The static address reservation protocol of the present invention provides an alternate aging algorithm so that network addresses can remain stored in a network intermediate device for the entirety of at least one reservation cycle which is typically much longer than the usual aging process for dynamic address entries. The persistence of the static address reservation reduces the need for flooding and thereby reduces necessary network traffic.

Lastly, the static address reservation protocol of the present invention can be operated with a backup protection mechanism so that the static address reservation process can continue even if the primary master fails.

The static address reservation protocol of the present invention has particular application in data networks where communications between a host and a number of machine stations are primarily one-way. That is, communications are primarily sent from the host to each machine station. Without the machine stations sending messages back to the host, the bridges or other network intermediate devices cannot learn the addresses and the associate ports of the machine stations. As a result, most of the network traffic from the host has to be broadcast traffic flooding all ports of the bridges in the network. By implementing the static address reservation protocol of the present invention in such a data network, the host can invite the machine stations to have their addresses become static entries in the network intermediate devices. If the network intermediate devices can maintain as static address entries the network addresses of the machine stations, a large amount of broadcast traffic can be eliminated.

The static address reservation protocol of the present invention also has particular application in data network configuration where communications through the network is primarily one-way, such as from a host to the terminal points only. When the communication is only one way, there is no opportunity for the network intermediate devices to learn the network address and the associated port of the terminal point as reverse communication is not available. By implementing the static address reservation protocol of the present invention, a primary master sends a periodic invitation message causing terminal points wishing to be static to respond. The network intermediate devices can then have an opportunity to learn and store the network addresses as either dynamic or static address entries.

The above detailed descriptions are provided to illustrate specific embodiments of the present invention and are not intended to be limiting. Numerous modifications and variations within the scope of the present invention are possible. The present invention is defined by the appended claims.

I claim:

1. A method in a data network, the data network including a plurality of terminal points interconnected by one or more network intermediate devices, the method comprising:

transmitting an invitation message from a first terminal point, the invitation message being broadcast through the one or more network intermediate devices of the data network to the plurality of terminal points;

in response to the invitation message, sending a reservation response message from a second terminal point, the reservation response message being broadcast through the one or more network intermediate devices of the data network to the plurality of terminal points;

receiving the reservation response message at a first network intermediate device; and     in response to the reservation response message, storing in a forwarding address table in the first network intermediate device for a reservation cycle a static forwarding address entry including the source address of the reservation response message and an identification of the port of the first network intermediate device on which the reservation response message is received, the static forwarding address entry being subjected to an aging process determined by the reservation cycle wherein the reservation cycle has a duration longer than a duration of a dynamic address entry aging process.

2. The method of claim 1, wherein the second terminal point is the first terminal point and the first terminal point sends the reservation response message to have its own source address become a static forwarding address entry in the one or more network intermediate devices.

3. The method of claim 1, wherein the transmission of an invitation message denotes the start of a reservation cycle, and the method further comprises:

at the expiration of each reservation cycle, repeating the step of transmitting an invitation message to the step of storing in the first network intermediate device a forwarding address entry, the invitation message being a periodic invitation message; and     in response to receiving the periodic invitation messages, aging the static forwarding address entries stored in the one or more network intermediate devices;

upon receipt of a reservation response message from a responding terminal point, determining at the first network intermediate device whether a static address entry has been stored for that responding terminal point;

if a static address entry has been stored for that responding terminal point, updating the static address entry associated with the responding terminal point; and     removing static forwarding address entries in the one or more network intermediate devices that have been aged.

4. The method of claim 3, wherein aging the static forwarding address entries stored in the one or more network intermediate devices comprises setting a time stamp associated with each static forwarding address entry indicating a first time value, and wherein updating the static address entry associated with the responding terminal point comprises updating the time stamp associated with the static forwarding entry of the responding terminal point.

5. The method of claim 4, wherein a static forwarding address entry in a network intermediate device is aged when the time stamp associated with the static forwarding address entry has elapsed beyond a predetermined amount of time.

6. The method of claim 3, wherein a static forwarding address entry in a network intermediate device is aged when a reservation response message having the corresponding source address has not been received for a predetermined amount of time.

7. The method of claim 3, wherein aging the static forwarding address entries stored in the one or more network intermediate devices comprises converting the static forwarding address entries into dynamic forwarding address entries, and wherein updating the static address entry associated with the responding terminal point comprises converting the dynamic forwarding address entry associated with the responding terminal point back to a static address entry, and wherein removing static forwarding address entries in the one or more network intermediate devices that have been aged comprises removing dynamic forwarding address entries that have been aged.

8. The method of claim 3, further comprising:

designating at each of the one or more network intermediate devices each reservation cycle as an even reservation cycle or an odd reservation cycle;

associating each static forwarding address entry stored in the one or more network intermediate devices with an even reservation cycle or an odd reservation cycle;

wherein aging the static forwarding address entries stored in the one or more network intermediate devices comprises aging the static forwarding address entries associated with an even reservation cycle when the current reservation cycle is an odd cycle and aging the static forwarding address entries associated with an odd reservation cycle when the current reservation cycle is an even cycle.

9. The method of claim 8, wherein aging the static forwarding address entries comprises converting the static forwarding address entries into dynamic forwarding address entries, and wherein updating the static address entry associated with the responding terminal point comprises converting the dynamic forwarding address entry associated with the responding terminal point back to a static address entry, and wherein removing static forwarding address entries in the one or more network intermediate devices that have been aged comprises removing dynamic forwarding address entries that have been aged.

10. The method of claim 1, wherein the transmission of an invitation message denotes the start of a reservation cycle, and the method further comprises:

at the expiration of each reservation cycle, repeating the step of transmitting an invitation message to the step of storing in the first network intermediate device a forwarding address entry, the invitation message being a periodic invitation message comprising a static reservation cycle time;

in response to receiving the periodic invitation messages, aging the static forwarding address entries stored in the one or more network intermediate devices;

upon receipt of a reservation response message from a responding terminal point, storing a static forwarding address entry associated with the responding terminal point for at least the static reservation cycle time;

if a time corresponding to the static reservation cycle time has elapsed prior to receiving another periodic invitation message, aging the static forwarding address entries stored in the one or more network intermediate devices; and removing static forwarding address entries in the one or more network intermediate devices that have been aged.

11. The method of claim 10, wherein the static reservation cycle time comprises a time period indicative of a time period between any two consecutive invitation messages having any time duration.

12. The method of claim 10, wherein aging the static forwarding address entries stored in the one or more network intermediate devices comprises converting the static forwarding address entries into dynamic forwarding address entries; and wherein removing static forwarding address entries in the one or more network intermediate devices that have been aged comprises removing dynamic forwarding address entries that have been aged.

13. The method of claim 10, wherein the periodic invitation message uses a first static reservation cycle time for a first group of terminal points and a second static reservation cycle time for a second group of terminal points, the first static reservation cycle time being different from the second static reservation cycle time.

14. The method of claim 1, wherein storing in the first network intermediate device for at least one reservation cycle a static forwarding address entry comprises:

storing the static forwarding address entry in a forwarding address table of the network intermediate device, the forwarding address table including entries for storing static forwarding addresses and entries for storing dynamic forwarding addresses.

15. The method of claim 1, wherein storing in the first network intermediate device for at least one reservation cycle a static forwarding address entry comprises:

storing the static forwarding address entry in a static forwarding address table of the network intermediate device, the static forwarding address table for storing static forwarding addresses only.

16. The method of claim 1, wherein after transmitting an invitation message from a first terminal point, the method further comprises:

determining at a third terminal point whether the invitation message has been received;

when the invitation message has not been received for a first predetermined amount of time, transmitting from the third terminal point a retransmit request message to the first terminal point;

determining at the third terminal whether a response message has been received from the first terminal point;

when the response message has not been received for a second predetermined amount of time, transmitting an invitation message from the third terminal point, the invitation message being broadcast through the data network to the plurality of terminal points.

17. The method of claim 16, wherein the first predetermined amount of time comprises the time duration of the reservation cycle.

18. The method of claim 16, wherein the first predetermined amount of time comprises a time duration specified in the invitation message.

19. The method of claim 16, wherein when the response message has not been received for a second predetermined amount of time, the method further comprises:

initiating a status change at the third terminal point for the third terminal to assume the functions of the first terminal point;

transmitting a notification message from the third terminal point to one or more of the plurality of terminal points, the notification message indicating the status change; and transmitting an invitation message from the third terminal point, the invitation message being broadcast through the data network to the plurality of terminal points.

20. The method of claim 19, wherein the first terminal point comprises a primary master device and the third terminal point comprises a first backup master device.

21. The method of claim 20, wherein the plurality of terminal points comprises a plurality of backup master devices in addition to the first backup master device.

22. The method of claim 21, wherein the notification message is a broadcast message directed to the plurality of terminal points.

23. The method of claim 21, wherein the notification message is a multicast message directed to the plurality of backup master devices and the first terminal point.

24. The method of claim 1, further comprising:

transmitting a leave static group message from a third terminal point, the third terminal point having its network address stored in at least one network intermediate device as a static forwarding address entry, the leave static group message being broadcast through the data network to the plurality of terminal points; and in response to the leave static group message, removing the static forwarding address entry associated with the leave static group message in the one or more network intermediate devices.

25. The method of claim 3, further comprising:

transmitting a topology change notification message from a second network intermediate device, the topology change notification message being transmitted through the data network to the plurality of terminal points through broadcasting or multicasting;

receiving the topology change notification message at the first terminal point; and in response to the topology change, initiating a new reservation cycle by transmitting a periodic invitation message from the first terminal point.

26. A method in a multi-port network intermediate device interconnecting a plurality of terminal points in a data network, each terminal point being associated with a corresponding port of the multi-port network intermediate device, the method comprising:

receiving a broadcast invitation message on a first port of the network intermediate device;

transmitting the broadcast invitation message to all of the ports except the first port;

receiving a broadcast reservation response message on a second port of the network intermediate device; and storing in a forwarding address table in the network intermediate device for one reservation cycle a static forwarding address entry including the source address of the broadcast reservation response message and an identification of the port of the network intermediate device on which the reservation response message is received, the static forwarding address entry being subjected to an aging process determined by the reservation cycle wherein the reservation cycle has a duration longer than a duration of a dynamic address entry aging process.

27. The method of claim 26, further comprising:

receiving a periodic invitation message on the first port at the expiration of each reservation cycle, the invitation message being a periodic invitation message;

in response to receiving the periodic invitation messages, aging the static forwarding address entries stored in the network intermediate device;

upon receipt of a reservation response message from a responding terminal point, determining whether a static address entry has been stored for that responding terminal point;

if a static address entry has been stored for that responding terminal point, updating the static address entry associated with the responding terminal point; and removing static forwarding address entries in the network intermediate device that have been aged.

28. The method of claim 27, wherein aging the static forwarding address entries stored in the network intermediate device comprises setting a time stamp associated with each static forwarding address entry indicating a first time value, and wherein updating the static address entry associated with the responding terminal point comprises updating the time stamp associated with the static forwarding entry of the responding terminal point.

29. The method of claim 28, wherein a static forwarding address entry in the network intermediate device is aged when the time stamp associated with the static forwarding address entry has elapsed beyond a predetermined amount of time.

30. The method of claim 27, wherein a static forwarding address entry in the network intermediate device is aged when a reservation response message having the corresponding source address has not been received for a predetermined amount of time.

31. The method of claim 27, wherein aging the static forwarding address entries stored in the network intermediate device comprises converting the static forwarding address entries into dynamic forwarding address entries, and wherein updating the static address entry associated with the responding terminal point comprises converting the dynamic forwarding address entry associated with the responding terminal point back to a static address entry, and wherein removing static forwarding address entries in the network intermediate device that have been aged comprises removing dynamic forwarding address entries that have been aged.

32. The method of claim 27, further comprising:

designating at the network intermediate device each reservation cycle as an even reservation cycle or an odd reservation cycle;

associating each static forwarding address entry stored in the network intermediate device with an even reservation cycle or an odd reservation cycle;

wherein aging the static forwarding address entries stored in the network intermediate device comprises aging the static forwarding address entries associated with an even reservation cycle when the current reservation cycle is an odd cycle and aging the static forwarding address entries associated with an odd reservation cycle when the current reservation cycle is an even cycle.

33. The method of claim 32, wherein aging the static forwarding address entries comprises converting the static forwarding address entries into dynamic forwarding address entries, and wherein updating the static address entry associated with the responding terminal point comprises converting the dynamic forwarding address entry associated with the responding terminal point back to a static address entry, and wherein removing static forwarding address entries in the one or more network intermediate devices that have been aged comprises removing dynamic forwarding address entries that have been aged.

34. The method of claim 26, further comprising:

receiving a periodic invitation message on the first port at the expiration of each reservation cycle, the invitation message being a periodic invitation message comprising a static reservation cycle time;

in response to receiving the periodic invitation messages, aging the static forwarding address entries stored in the network intermediate device;

upon receipt of a reservation response message from a responding terminal point, storing a static forwarding address entry associated with the responding terminal point for at least the static reservation cycle time;

if a time corresponding to the static reservation cycle time has elapsed prior to receiving another periodic invitation message, aging the static forwarding address entries stored in the network intermediate device; and removing static forwarding address entries in the one or more network intermediate devices that have been aged.

35. The method of claim 34, wherein aging the static forwarding address entries stored in the network intermediate device comprises converting the static forwarding address entries into dynamic forwarding address entries; and wherein removing static forwarding address entries in the one or more network intermediate devices that have been aged comprises removing dynamic forwarding address entries that have been aged.

36. The method of claim 26, wherein storing in the network intermediate device for at least one reservation cycle a static forwarding address entry comprises:

storing the static forwarding address entry in a forwarding address table of the network intermediate device, the forwarding address table including entries for storing static forwarding addresses and entries for storing dynamic forwarding addresses.

37. The method of claim 26, wherein storing in the network intermediate device for at least one reservation cycle a static forwarding address entry comprises:

storing the static forwarding address entry in a static forwarding address table of the network intermediate device, the static forwarding address table for storing static forwarding addresses only.

38. The method of claim 26, further comprising:

receiving a leave static group message on a port of the network intermediate device; and in response to the leave static group message, removing the static forwarding address entry associated with the source address of the leave static group message in the network intermediate device if a static forwarding address entry has been stored.

39. The method of claim 27, further comprising:

transmitting a topology change message from the network intermediate device; and receiving a broadcast invitation message in response to the topology change message indicating the start of a new reservation cycle.

40. A network intermediate device for interconnecting terminal points in a data network, comprising:

a plurality of ports coupled to transmit messages to and receive messages from terminal points connected thereto;

a controller; and a memory unit for storing a forwarding address table, wherein the network intermediate device is operative to transmit broadcast invitation messages received on a first port of the plurality of ports to the plurality of ports except the first port; and upon receipt of a broadcast reservation response message on a second port, a static forwarding address entry is made in the forwarding address table, the static forwarding address entry including the source address of the broadcast reservation response message and an identification of the port of the network intermediate device on which the broadcast reservation response message is received, the static forwarding address entry being subjected to an aging process determined by a reservation cycle wherein the reservation cycle has a duration longer than a duration of a dynamic address entry aging process.

41. The network intermediate device of claim 40, wherein the network intermediate device subjects the static forwarding address entries in the forwarding address table to an aging process when an invitation message is received, and wherein upon receipt of a reservation response message from a responding terminal point, the network intermediate device updates the static forwarding address entry associated with the responding terminal point when a static forwarding address entry is already stored in the forwarding address table.

42. The network intermediate device of claim 41, wherein the network intermediate device removes static forwarding address entries in the network intermediate device that have been aged.

43. The network intermediate device of claim 42, wherein a static forwarding address entry in the network intermediate device is aged when a reservation response message having the corresponding source address has not been received for a predetermined amount of time.

44. The network intermediate device of claim 42, wherein a static forwarding address entry in the network intermediate device is aged by converting the static forwarding address entry to a dynamic forwarding address entry.

45. The network intermediate device of claim 40, wherein the forwarding address table comprises entries for static forwarding addresses and entries for dynamic forwarding addresses.

46. The network intermediate device of claim 40, wherein the forwarding address table comprises a first table for storing static forwarding addresses and a second table for storing dynamic forwarding addresses.

* * * * *